(12) United States Patent
Tserkovnyuk et al.

(10) Patent No.: US 6,529,175 B2
(45) Date of Patent: Mar. 4, 2003

(54) STEREOSCOPIC LCD SHUTTER GLASS DRIVER SYSTEM

(75) Inventors: Walter Tserkovnyuk, Yonkers, NY (US); Adam W. Divelbiss, Wappingers Falls, NY (US)

(73) Assignee: VRex, Inc., Elmsford, NY (US)

( * ) Notice: Subject to any disclaimer, the term of this patent is extended or adjusted under 35 U.S.C. 154(b) by 129 days.

(21) Appl. No.: 09/770,539

(22) Filed: Jan. 25, 2001

(65) Prior Publication Data

US 2001/0038358 A1 Nov. 8, 2001

Related U.S. Application Data

(60) Provisional application No. 60/178,500, filed on Jan. 27, 2000.

(51) Int. Cl.[7] ............................ G09G 5/00; H04N 15/00; H04N 5/08
(52) U.S. Cl. ................................ 345/9; 348/56; 348/525
(58) Field of Search ................................ 345/87, 91, 9, 345/211–213; 348/42, 43–60, 51–56, 525–529

(56) References Cited

U.S. PATENT DOCUMENTS

| | | | | |
|---|---|---|---|---|
| 4,979,033 A | * | 12/1990 | Stephens | 348/51 |
| 5,028,994 A | * | 7/1991 | Miyakawa et al. | 348/42 |
| 5,790,234 A | * | 8/1998 | Matsuyama | 351/210 |
| 5,896,116 A | * | 4/1999 | Torizuka et al. | 345/87 |
| 5,963,200 A | * | 10/1999 | Deering et al. | 345/1.2 |
| 6,191,772 B1 | * | 2/2001 | Mical et al. | 345/606 |
| 6,313,888 B1 | * | 11/2001 | Tabata | 348/739 |
| 6,377,230 B1 | * | 4/2002 | Yamazaki et al. | 345/5 |

* cited by examiner

Primary Examiner—Steven Saras
Assistant Examiner—Michael J Moyer
(74) Attorney, Agent, or Firm—Gerow D. Brill

(57) ABSTRACT

The preferred embodiment a stereoscopic LCD shutter glass driver system requires only a total of 3 CMOS integrated circuit chips in order to convert horizontal and vertical sync signals into LCD shutter glass drive signals. A negative charge pump is used increase the LCD drive voltage thereby reducing 3D crosstalk in the image. The video signal input is shown with a passthrough connection intended for direct hook-up to a television or CRT monitor. A first flip flop detects vertical and horizontal sync and is used to drive the charge pump. A stable, predictable field ID signal is produced by the flip flop whose two complimentary outputs act as inputs to a second flip flop chip which produces the drive signals for the LCD shutter glasses. A third flip flop produces a LCD "common" signal that is sent to both LCD shutters. The second flip flop produces a drive signal for each LCD shutter. A field swap between the two shutters is implemented with a switch located at the output of the third flip flop.

8 Claims, 2 Drawing Sheets

STEREOSCOPIC LCD SHUTTER GLASS DRIVER SYSTEM

This application claimed benefit of Serial No. 60/178,500 filed on Jan. 27, 2000.

BACKGROUND OF THE INVENTION

This invention relates to a 3D viewing system, particularly to a stereoscopic LCD shutter glass driving method and apparatus.

Stereoscopic or three-dimensional vision may be created on a two-dimensional medium by creating a pair of stereoscopic images; a left eye image and right eye image. If a viewer sees only the left eye image with the left eye and the right eye image with the right eye, the viewer perceives a three dimensional image from the two stereoscopic images. Conventional video display devices produce an image by creating a plurality of horizontal display lines interlaced in two fields within a frame.

LCD shutter glasses are an electronically controlled set of glasses that are opened and closed under control of a video system. The switching of these shutters is commonly done at the field rate. That is, a left image LCD shutter lens is switched on during one field and the right LCD shutter lens is switched off during this field. The opposite is done in the other field. There is a need to keep these LCD shutter glasses as inexpensive as possible. In particular, it necessary to keep the control electronics of the LCD shutter glasses as inexpensive as possible. In addition, battery operation of such a device is necessary while still achieving the maximum performance from the LCD shutter glass shutters.

BRIEF SUMMARY OF THE INVENTION

The embodiments of the invention include a method and apparatus for an economical method and apparatus for synchronizing the outputs of the left and right outputs of a 3D or stereoscopic video camera or other video output. A stereoscopic LCD Shutter glass driver for video signal input is a device that synchronizes the shutter of a pair of LCD shutter glasses with the fields of an NTSC, PAL, or other dual field video signal for the purpose of displaying a 3D stereoscopic image on a television set or other CRT based monitor system accepting these video signal formats. This driver has the effect of alternately blocking the view of the left (right) eye during display of field one and blocking the view of the right (left) eye during display of field two. If the input video signal has been properly formatted with left (right) perspective information on field one and right (left) perspective information on field two then the resulting image displayed on the television or CRT based monitor or other such device will appear to have stereoscopic depth when viewed through the LCD shutter glasses driven by the said driver system.

There are several existing 3D shutter glass driver systems for video including: StereoGraphics' Simuleyes VR, and 3DTV Corp.'s StereoDriver™ Model 2001. The invention described in this disclosure improves on these devices by greatly decreasing the number of components required to drive the shutter glasses and interpret the incoming video signal and thereby affecting a reduction in cost. In addition, power to the preferred embodiment of the invention described herein can be supplied by either a wall mounted 6–9 V DC power supply or by 4 AAA batteries. In addition to reduced cost, the reduced number of components lends itself to smaller size if so desired.

The stereoscopic LCD shutter glass driver system includes a sync separator coupled to a video input with a first output and a second output of said sync separator coupled to a first flip flop. In addition a third output of the sync separator is coupled to a negative charge pump. The negative charge pump provides a negative voltage to a second and third flip flop to generate pulses of greater amplitude than available with the power supply. A first output of the first flip flop is coupled to a second flip flop and a second output of the first flip flop coupled to a third flip flop. A first output of the second flip flop is coupled to a first terminal of a first (left or right image) LCD shutter glass, a second output of the second flip flop is coupled to a first terminal of a second (right or left) LCD shutter glass.

A first output of the third flip flop is coupled to a first input terminal of a switch and a second output of the third flip flop is coupled to a second input terminal of said switch. An output of the switch is coupled to a second terminal of the first LCD shutter glass and the second LCD shutter glass. This configuration produces a switching pulse train to each LCD shutter glass such that each LCD shutter glass is open every other field and the two shutter glasses are open and closed during opposite fields.

BRIEF DESCRIPTION OF THE DRAWINGS

For a more complete understanding of the present invention, the Detailed Description is to be read in conjunction with the following drawings, wherein.

DETAILED DESCRIPTION OF THE INVENTION

A stereoscopic video signal needs to be synchronized electrically to produce the most realistic stereoscopic effect. As is well known in the art, a standard stereoscopic image contains two images produced by video sources that are synchronized electrically and mechanically. A well known technique is to place a signal representing the so called left image into one field of a video signal and the so called right image into the other field of the video signal. Unfortunately, there is no standard practice of placing the left image in a particular field or the right image in a particular field. Display systems and the viewing glasses need to have the ability to select which pattern is used. One pattern would thus represent a true stereoscopic display to the viewer and the other would represent a pseudo stereo display to the viewer.

Figure 1:
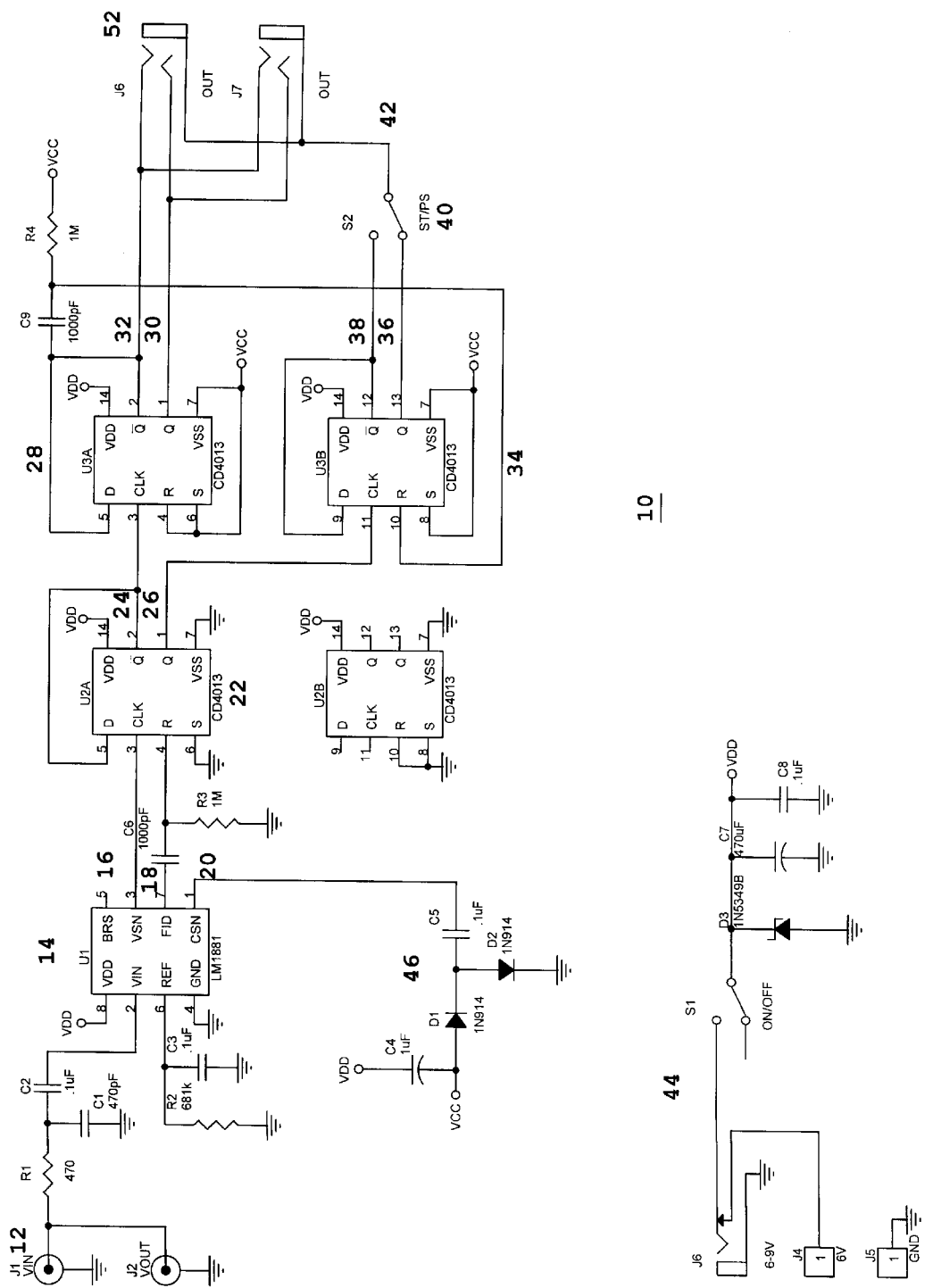
FIG. 1 illustrates a schematic diagram of an exemplary embodiment of the invention.

FIG. 1 illustrates a detailed schematic diagram of an example of this embodiment. The exemplary embodiment in FIG. 1 10 has as an input a video signal 12 connected to a Sync Separator 14. The video signal may be the actual video signal containing the stereoscopic signals or be a video signal that is in synchronization with the stereoscopic video signal. The stereoscopic video signal may be directly from a stereoscopic video camera as described in provisional patent application No. 60/173249 by the instant inventors filed on Dec. 28, 1999 or from the output of a recording system or other playback system. The outputs of the Sync Separator 14 include a Vertical Sync Output 16, a Field Identification Pulse 18 and a Composite Sync Output 20. The exemplary sync separator is an LM 1881 produced by National Semiconductor Corporation and is well known to those skilled in the art.

The repetition rate of Vertical Sync Output signal 16 is equal to the field rate of the input video signal. If the input signal is an NTSC 525/60 signal, the pulse repetition rate is 60 Hz. If the input video signal is a PAL 625/50 signal, the pulse repetition rate is 50 Hz. The Vertical Sync Output signal 16 and the Field Identification Pulse signal 18 are coupled to a first D type flip flop U2 22. The Composite Sync Output signal 20 of the Sync Separator 14 is coupled to a Negative Charge Pump 46 (to be discussed below).

Figure 2:
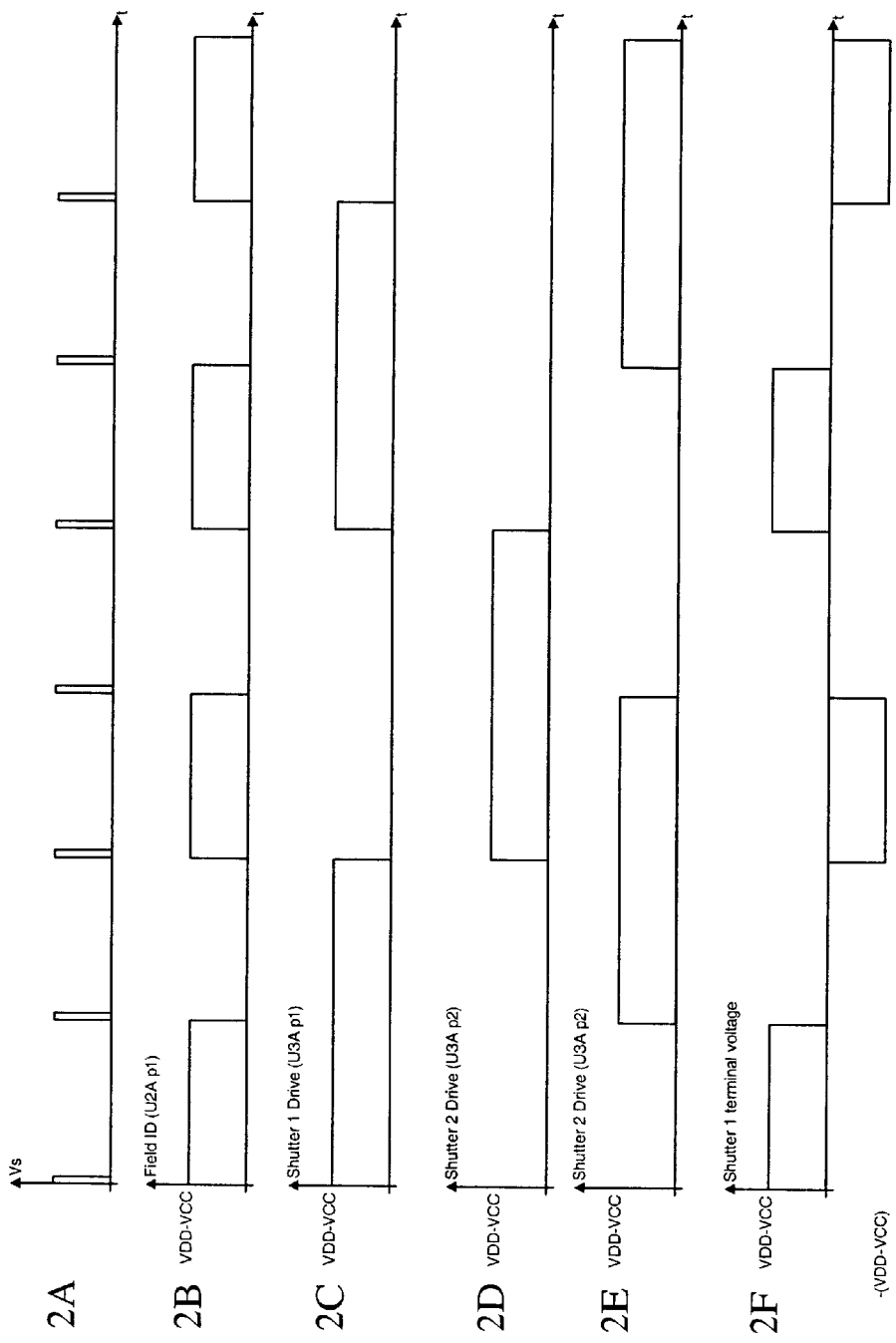
FIG. 2 illustrates a timing diagram of the exemplary embodiment of the invention.

FIG. 2 illustrates the timing of the various pulses within the exemplary embodiment. FIG. 2a illustrates the Vertical Sync Output 16 of Sync Separator U1 16. A first flip flop U2 22 produces complementary Field Identification pulses 24 and 26. One of the complementary pulses is illustrated in FIG. 2b as positive pulses during every other field. These Field Identification pulses 24 and 26 are coupled to a second and third flip flop U3a 28 and U3B 34.

The second flip flop U3A 28 generates complementary shutter drive signals 30 and 32 as shown in FIGS. 2c and 2d. The first of these shutter drive signals is coupled via a jack 52 to a first terminal of a first (left/right) LCD shutter glass. The second of these shutter drive signals is coupled via jack 52 to a first terminal of a second (right/left) LCD shutter glass. It will be noted from FIGS. 2c and 2d that these shutter drive signals are two field positive pulses that are positive during opposite frames (a frame comprise two fields).

The third flip flop U3B 34 generates complementary pulses Shutter Common 36 and 38. One of these pulses 36 is illustrated in FIG. 3e. Note that this pulse is a two field pulse that staggers the transition between the positive area of Shutter 1 Drive pulse 30 and Shutter 2 Drive pulse 32. Pulse 36 and its complement pulse 38 are coupled to switch S2 40. The output of switch S2 provides a Shutter Common signal 42.

The LCD Shutters are coupled to the system via Jacks 6 or 7. The combination of the Shutter Drive signal 30 or 32 and the selected Shutter Common signal 36 or 38 produces the signal as illustrated by FIG. 2f. Note that the voltage across the LCD Shutter Glass is positive during a first field, followed by a field of no signal, followed by a field with a negative signal and completed with a field of no signal. The pattern is followed every four fields. An LCD Shutter Glass needs to have the polarity of its input voltage varied in order to avoid performance loss over its expected life span.

One of the objects of this invention is to provide an inexpensive way to synchronize the switching of LCD Shutter glasses while not reducing their performance. One of the ways to keep the cost down is to minimize the cost of the power supply. A goal of the designers is to be able to operate the system at a voltage of 6 volts. However, the optimum performance of the LCD shutter glasses is at a higher voltage, such as 11 volts. Therefore a negative charge pump 46 in conjunction with power supply 44 is used to provide 11 volt pulses to the LCD Shutter glasses.

The Negative Charge Pump receives a Composite Sync signal 20 from the Sync Separator U1 14. This signal in combination with C4, C5, D1, D2 and VDD (the power supply positive voltage) produces an approximate −5 volt signal VCC. The combination of VDD and VCC produces an 11 volt signal. VCC is coupled to the negative power supply terminals of U3A 28 and U3B 34. These terminals would normally be connected to ground. VDD is coupled to the positive power supply terminals of U3A 28 and U3B 34. With this power supply arrangement, the pulse outputs of U3A 28 and U3B 34 are equal to approximately 11 volts. This produces Shutter 1 and Shutter 2 Drive signals 30 and 32 and Shutter Common signal 36 and 38 having peak to peak amplitudes equal to VDD-VCC as shown in FIGS. 2c –2f.

As can be seen, this preferred embodiment requires only a total of 3 CMOS integrated circuit chips in order to convert horizontal and vertical sync signals into LCD shutter glass drive signals. A negative charge pump is used to increase the LCD drive voltage thereby reducing 3D crosstalk in the image. The video signal input is shown with a passthrough connection intended for direct hook-up to a television or CRT monitor. Integrated circuit chip U1 detects vertical and horizontal sync and is used to drive the charge pump. A stable, predictable field ID signal is produced by the U2 a CMOS D-flip flop chip whose two complimentary outputs act as inputs to a second stage D-flip flop chip (U3) which produces the drive signals for the LCD shutter glasses. U3B produces a LCD "common" signal that is sent to both LCD shutters. U3A produces a drive signal for each LCD shutter. A field swap between the two shutters is implemented with switch S2 located at the output of U3B.

The various embodiments of the present invention will be usefull in many diverse stereoscopic imaging applications. However, it is understood that various modifications to the illustrative embodiments of the present invention will readily occur to persons with ordinary skill in the art. All such modifications and variations are deemed to be within the scope and spirit of the present invention as defined by the claims appended hereto.

What is claimed is:

1. A stereoscopic LCD shutter glass driver system comprising:

a sync separator coupled to a video input;

a first output and a second output of said sync separator coupled to a first flip flop;

a third output of said sync separator coupled to a negative charge pump;

a first output of said first flip flop coupled to a second flip flop and a second output of said first flip flop coupled to a third flip flop;

a first output of said second flip flop coupled to a first terminal of a first LCD shutter glass, a second output of said second flip flop coupled to a first terminal of a second LCD shutter glass;

a first output of said third flip flop coupled to a first input terminal of a switch and a second output of said third flip flop coupled to a second input terminal of said switch;

an output of said switch is coupled to a second terminal of said first LCD shutter glass and said second LCD shutter glass, wherein said system produces said system generates a switching pulse train to each LCD shutter glass such that each LCD shutter glass is open every other field and the two shutter glasses are open and closed during opposite fields.

2. The system of claim 1 wherein an amplitude of said switching pulses is determined by a negative charge pump.

3. The system of claim 2 wherein said negative charge pump is driven by a composite sync output of said sync separator.

4. The system of claim 1 wherein said first output of said sync separator is a vertical sync signal.

5. The system of claim 1 wherein said second output of said sync separator is a field identification pulse.

6. The system of claim 1 wherein said third output of said sync separator is a composite sync signal.

7. A method of synchronizing stereoscopic LCD shutter glasses comprising:

providing a video signal to a sync separator;

coupling a first output and a second output of said sync separator coupled to a first flip flop;

coupling a third output of said sync separator to a negative charge pump;

coupling a first output of said first flip flop to a second flip flop and a second output of said first flip flop to a third flip flop;

coupling a first output of said second flip flop to a first terminal of a first LCD shutter glass and a second output of said second flip flop to a first terminal of a second LCD shutter glass;

coupling a first output of said third flip flop to a first input terminal of a switch and a second output of said third flip flop coupled to a second input terminal of said switch;

coupling an output of said switch to a second terminal of said first LCD shutter glass and said second LCD shutter glass, wherein said method produces a switching pulse train to each LCD shutter glass such that each LCD shutter glass is open every other field and said two shutter glasses are open and closed during opposite fields.

8. A stereoscopic LCD shutter glass driver system comprising:

means for providing a video signal to a sync separator;

means for coupling a first output and a second output of said sync separator coupled to a first flip flop;

means for coupling a third output of said sync separator to a negative charge pump;

means for coupling a first output of said first flip flop to a second flip flop and a second output of said first flip flop to a third flip flop;

means for coupling a first output of said second flip flop to a first terminal of a first LCD shutter glass and a second output of said second flip flop to a first terminal of a second LCD shutter glass;

means for coupling a first output of said third flip flop to a first input terminal of a switch and a second output of said third flip flop coupled to a second input terminal of said switch;

means for coupling an output of said switch to a second terminal of said first LCD shutter glass and said second LCD shutter glass, wherein said system produces a switching pulse train to each LCD shutter glass such that each LCD shutter glass is open every other field and said two shutter glasses are open and closed during opposite fields.

* * * * *